No. 12,332. REISSUED MAR. 28, 1905.

B. JACOB.

MATCH.

APPLICATION FILED FEB. 20, 1905

Witnesses:

John T. McCannon Jr.

Inventor:

Bartholomew Jacob by Pierpont Davis, attorney

No. 12,332. Reissued March 28, 1905.

UNITED STATES PATENT OFFICE.

BARTHOLOMEW JACOB, OF NEW ROCHELLE, NEW YORK.

MATCH.

SPECIFICATION forming part of Reissued Letters Patent No. 12,332, dated March 28, 1905.

Original No. 763,670, dated June 28, 1904. Application for reissue filed February 20, 1905. Serial No. 246,646.

*To all whom it may concern:*

Be it known that I, BARTHOLOMEW JACOB, a citizen of the United States, residing at New Rochelle, in the county of Westchester and State of New York, have invented a new and original Combination Match and Igniter, of which the following is a specification.

My invention relates to an improvement in matches or fusees of any type or description whatsoever in which there is an igniter with every match or fusee in the form of a tubular casing surrounding but only inclosing a part of such match or fusee; and the objects of my invention are, first, the possibility of lighting a match or fusee with one hand while the other hand is otherwise engaged, especially in any kind of rainy, windy, or stormy weather, close to the object to be fired—such as a cigar, cigarette, or pipe, &c.—rendering separate scratchers unnecessary; second, a source of protection from the wet or dampness, and, third, if carried loosely is any receptacle—such as a pocket, pouch, &c.—to prevent ignition by their rubbing against each other. I attain these objects by the mechanism illustrated in the accompanying drawings.

Figure 1 is a view of my combination match and igniter as it looks complete. *a* is the tubular casing surrounding but partly inclosing the match or fusee, which is hereinafter described. *b* is the end of the match or fusee protruding from out of the end of the tubular casing.

Fig. 2 is a view of a longitudinal section of the tubular casing, showing the match in its correct position inside. *c* shows the inner surface of one end of the tubular casing, which is coated with a rough surface of sand, glue, or other rubbing compound to ignite the match or fusee, as is hereinafter described. *d* is the place where the match may be slightly glued to keep it in its place and which will not resist the pressing or pushing of the match or fusee through, as is hereinafter described.

Figure 4:
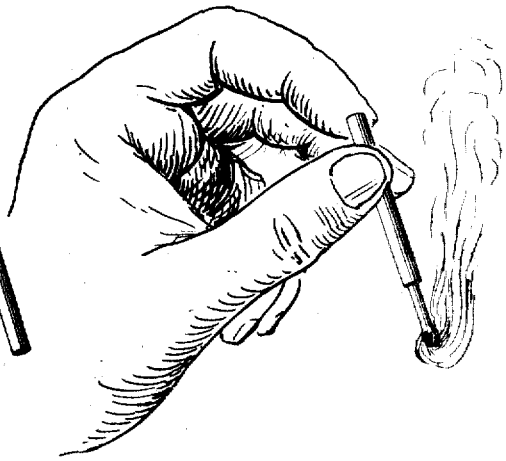
Fig. 4 is a view showing my combination match and igniter after the match or fusee has been pressed or pushed through the tubular casing, resulting in the ignition of the match or fusee.

My invention consists of a combination of a tubular casing and a match or fusee the head end and most of which is inclosed by the former. By pressing or pushing the end of said match or fusee which is protruding from one end of the tubular casing through said tubular casing the head of said match or fusee comes in contact with the frictional surface on the inside of the other end of said tubular casing and in consequence is ignited, the ignited head appearing through said other end of said tubular casing, all more particularly described, as follows: The tubular casing must be shorter than the match or fusee which it partly incloses, preferably three-quarters as long as the match or fusee. This is so as to allow the head of said match or fusee to appear through the end where the rubbing compound is situated after it has been pressed or pushed through it, as shown in Fig. 4.

The material with which the tubular casing is made should be paper or thin cardboard.

Figure 1:
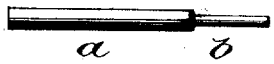
Figure 2:
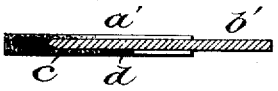

The tubular casing must be open at both ends. It must be just large enough to allow of the match or fusee being inside and must fit sufficiently closely about said match or fusee to prevent it from slipping off, but loosely enough to allow the match or fusee to move through upon pressing or pushing slightly. The end of the tubular casing through which the ignited match or fusee head appears when it is used as is hereinafter described must be coated within—say for about one-quarter of its length—with a rough surface, such as mixture of sand and glue, in the case of the sulfur or parlor match variety, or any rubbing compound which will ignite the match or fusee when the head is rubbed over it, as is shown in Fig. 2 at *c*. The tubular casing must inclose the head end and the part of the stick next to the head, allowing the other end and part of the stick to protrude from said tubular casing. It is better that the tubular casing should inclose two-thirds of the match or fusee, as is shown in Figs. 1 and 2.

The match or fusee used in the tubular casing may be of any ordinary variety now generally in use and might be tapered toward the head to prevent it from slipping entirely through the tubular casing when pressed or pushed through to light. However, this is unnecessary, as the tubular casing can be so made as to keep the match or fusee in position. The match or fusee may also be very lightly glued to the inside of the tubular casing in order to keep it in its proper position, as is shown in Fig. 2 at *d*. In its manufacture this may be done in conjunction with the application of the rubbing compound to the inside of the tubular casing.

Figure 3:
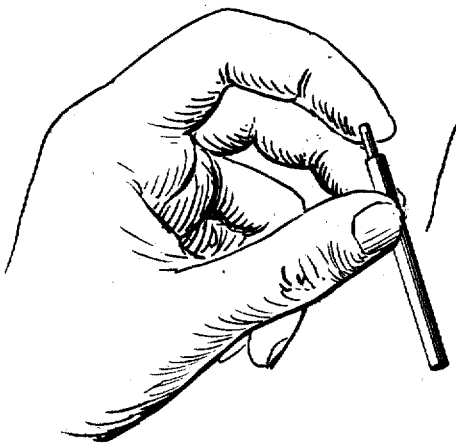
Fig. 3 is a view showing the manner in which my combination match and igniter should be held for use.

My combination match and igniter should be used as follows: Hold it in one hand with the middle finger and thumb on the tubular casing, as is shown in Fig. 3, and with the forefinger press the end of the match or fusee which is protruding from the end of said tubular casing downward through said tubular casing as far as is necessary, as shown in Fig. 4. When the head of the match or fusee comes in contact with the rubbing compound at the other end of the tubular casing, the head of said match or fusee will become ignited, the ignited head appearing through said other end of said tubular casing. Then it will be ready to be applied to the article to be fired.

Having described my invention, what I claim as new, and desire to secure by Letters Patent of the United States, is—

As a new article of manufacture, a combination match and igniter comprising an ordinary match or fusee and a tubular casing, the tubular casing surrounding but only partially inclosing the match or fusee and being detachably connected therewith, being open at both ends, shorter than the match or fusee, the head being inclosed and allowing the other end of said match or fusee to protrude, provided with a rubbing compound which is located in the path of travel with the head of the match or fusee whereby the match or fusee is ignited when the end of the said match or fusee is pressed or pushed through the end of the tubular casing, substantially as described.

In testimony whereof I have signed my name to this specification in the presence of two subscribing witnesses.

BARTHOLOMEW JACOB.

Witnesses:

JOSEPH DU VIVIS,
THOMAS KEARNY.

Correction in Reissue Letters Patent No. 12,332.

It is hereby certified that in Reissue Letters Patent No. 12,332, granted March 28, 1905, upon the application of Bartholomew Jacob, of New Rochelle, New York, for an improvement in "Matches," an error appears in the printed specification requiring the following correction, viz: In line 22, page 1, the word "is" should read *in*; and that the said Letters Patent should be read with this correction therein that the same may conform to the record of the case in the Patent Office.

Signed and sealed this 11th day of April, A. D. 1905.

[SEAL.]

F. I. ALLEN,
*Commissioner of Patents.*